(12) United States Patent
Hwang (10) Patent No.: US 12,043,239 B2
(45) Date of Patent: Jul. 23, 2024

(54) BRAKE APPARATUS FOR VEHICLE AND CONTROL METHOD THEREFOR

(71) Applicant: HYUNDAI MOBIS CO., LTD., Seoul (KR)

(72) Inventor: Woo Hyun Hwang, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 331 days.

(21) Appl. No.: 17/730,327

(22) Filed: Apr. 27, 2022

(65) Prior Publication Data
US 2022/0388487 A1 Dec. 8, 2022

(30) Foreign Application Priority Data
Jun. 3, 2021 (KR) .......................... 10-2021-0072039

(51) Int. Cl.
| | |
|---|---|
| *B60T 8/92* | (2006.01) |
| *B60Q 9/00* | (2006.01) |
| *B60T 8/88* | (2006.01) |
| *B60T 17/22* | (2006.01) |

(52) U.S. Cl.
CPC .................. *B60T 8/92* (2013.01); *B60Q 9/00* (2013.01); *B60T 8/885* (2013.01); *B60T 17/22* (2013.01); *B60T 2270/402* (2013.01); *B60T 2270/406* (2013.01); *B60T 2270/413* (2013.01)

(58) Field of Classification Search
CPC . B60T 8/92; B60T 8/885; B60T 17/22; B60T 2270/402; B60T 2270/406; B60T 2270/413; B60Q 9/00
See application file for complete search history.

(56) References Cited

U.S. PATENT DOCUMENTS

| | | | | | |
|---|---|---|---|---|---|
| 4,561,527 | A | * | 12/1985 | Nakamoto | B60T 7/12 192/35 |
| 5,032,995 | A | * | 7/1991 | Matsuda | B60K 23/0808 701/91 |
| 6,498,403 | B1 | * | 12/2002 | Hagidaira | B62D 5/0484 307/9.1 |
| 6,969,127 | B2 | * | 11/2005 | Suzuki | B60T 13/741 303/20 |
| 9,399,472 | B2 | * | 7/2016 | Minoiu-Enache | B60W 50/02 |
| 2013/0282249 | A1 | * | 10/2013 | Heise | B60T 13/746 701/70 |
| 2022/0032894 | A1 | * | 2/2022 | Park | B60T 13/588 |
| 2022/0396249 | A1 | * | 12/2022 | Lee | B60T 7/107 |

* cited by examiner

*Primary Examiner* — Gertrude Arthur Jeanglaude
(74) *Attorney, Agent, or Firm* — NovoTechIP International PLLC (57) ABSTRACT

The present disclosure provides an apparatus for controlling braking of a vehicle, comprising: a first switching member configured to receive a parking start signal and generate a first drive signal; a second switching member configured to receive the parking start signal and generate a second drive signal; a first controller configured to receive the first drive signal; a second controller configured to receive the second drive signal, the first and second controllers further configured to transceive a switch fail signal with each other; and an electronic parking brake motor configured to be controlled by at least one of the first and second controllers, wherein, when at least one of the first and second drive signals is abnormal, the electronic parking brake motor is controlled by at least one of the first and second controllers based on the switch fail signal.

15 Claims, 5 Drawing Sheets

BRAKE APPARATUS FOR VEHICLE AND CONTROL METHOD THEREFOR

CROSS-REFERENCE TO RELATED APPLICATIONS

This application claims priority to Korean Patent Application No. 10-2021-0072039, filed on Jun. 3, 2021, the disclosure of which is incorporated herein by reference in its entirety.

BACKGROUND

1. Technical Field

The present disclosure relates to a brake apparatus for a vehicle. More particularly, the present disclosure relates to an electronic parking brake for a vehicle equipped with a redundancy system.

2. Discussion of Related Art

The content described in this section merely provides the background information on the present disclosure and does not constitute the prior art.

As autonomous driving is developing to a higher level, a driver's intervention is reduced, so it is essential to ensure precise safety technology in preparation for emergency situations. Therefore, a vehicle into which an autonomous driving function will be introduced in the future, such as an electric vehicle, should necessarily have reliability for a parking brake function. Many companies are building a redundancy system of the parking brake function so as to ensure reliability for the parking brake function.

Recently, the role of an electronic parking brake (EPB) is extending to a main brake apparatus for braking a vehicle when the vehicle is running as well as when the vehicle is parked. Therefore, it is important to ensure reliability for the parking brake function.

There has been proposed a method of providing a redundancy structure to an Electronic Control Unit (ECU) for controlling a parking brake apparatus. Even if the ECU has the redundancy structure to cope with electrical failures, the reliability for the parking brake function cannot be ensured when a single EPB switch fails. Nevertheless, most of redundancy systems for parking brake apparatuses are directed to the redundancy of the ECU, and a redundancy system is not applied to a switch for generating the drive signal of the ECU

SUMMARY

In view of the above, the present disclosure provides a brake apparatus for a vehicle, in which a first switching member and a second switching member are included in the brake apparatus for the vehicle, so that it is possible to ensure reliability for a parking brake function.

The problems to be solved by the present disclosure are not limited to the above-mentioned problems, and other problems which are not mentioned will be clearly understood by those skilled in the art from the following description.

According to at least one embodiment, the present disclosure provides an apparatus for controlling braking of a vehicle, comprising: a first switching member configured to receive a parking start signal and generate a first drive signal in response to receiving the parking start signal; a second switching member configured to receive the parking start signal and generate a second drive signal in response to receiving the parking start signal; a first controller configured to receive the first drive signal generated by the first switching member; a second controller configured to receive the second drive signal generated by the second switching member, the first and second controllers further configured to transceive a switch fail signal with each other; and an electronic parking brake motor configured to be controlled by at least one of the first and second controllers, wherein, when at least one of the first and second drive signals is abnormal, the electronic parking brake motor is controlled by at least one of the first and second controllers based on the switch fail signal.

According to another embodiment, the present disclosure provides a method of operating a brake apparatus for a vehicle, the brake apparatus comprising an electronic parking brake, first and second switching members, first and second controllers, the method comprising: receiving, at the first switching member, a parking start signal and causing the first switching member to transmit a first drive signal; receiving, at the second switching member, the parking start signal and causing the second switching member to transmit a second drive signal; receiving, at the first controller, the first drive signal transmitted from the first switching member; receiving, at the second controller, the second drive signal transmitted from the second switching member; causing the first and second controllers to transceive a switch fail signal with each other; and controlling an electronic parking brake motor using at least one of the first and second controllers based on the switch fail signal when at least one of the first drive signal and the second drive signal is abnormal.

As described above, a brake apparatus for a vehicle according to the present disclosure is advantageous in that a first switching member and a second switching member are included in the brake apparatus for the vehicle, so that it is possible to ensure reliability for a parking brake function.

DETAILED DESCRIPTION

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric codes such as first, second, i), ii), a), b), etc., in numbering components are used solely for the purpose of differentiating one component from the other but not to imply or suggest the substances, the order, or sequence of the components. Throughout this specification, when parts "include" or "comprise" a component, they are meant to further include other components, not excluding thereof unless there is a particular description contrary thereto.

A brake apparatus for a vehicle according to an embodiment of the present disclosure includes all or some of a first switching member 121, a second switching member 123, a first controller 131, a second controller 133, an electronic parking brake motor 140, a digital signal transmission line 150, a memory unit, a first warning light, an emergency switching member 410, and a second warning light.

The first switching member 121 is configured to receive a parking start signal and generate a first drive signal in response to receiving the parking start signal. The second switching member 123 is configured to receive the parking start signal and generate a second drive signal in response to receiving the parking start signal. Here, the parking start signal may be an electric signal. However, without being limited thereto, the parking start signal may be the action of pressing two switching members 121 and 123 together by a person who manipulates a parking start signal input means 110. In this connection, the term "together" means a case of physically receiving the parking start signal at the same time as well as a case in which the switching members 121 and 123 receive the parking start signal at the same time according to socially accepted idea.

The brake apparatus for the vehicle according to an embodiment of the present disclosure may further include an input means 110 which transmits a parking start signal to the first switching member 121 and the second switching member 123 at the same time.

Figure 1:
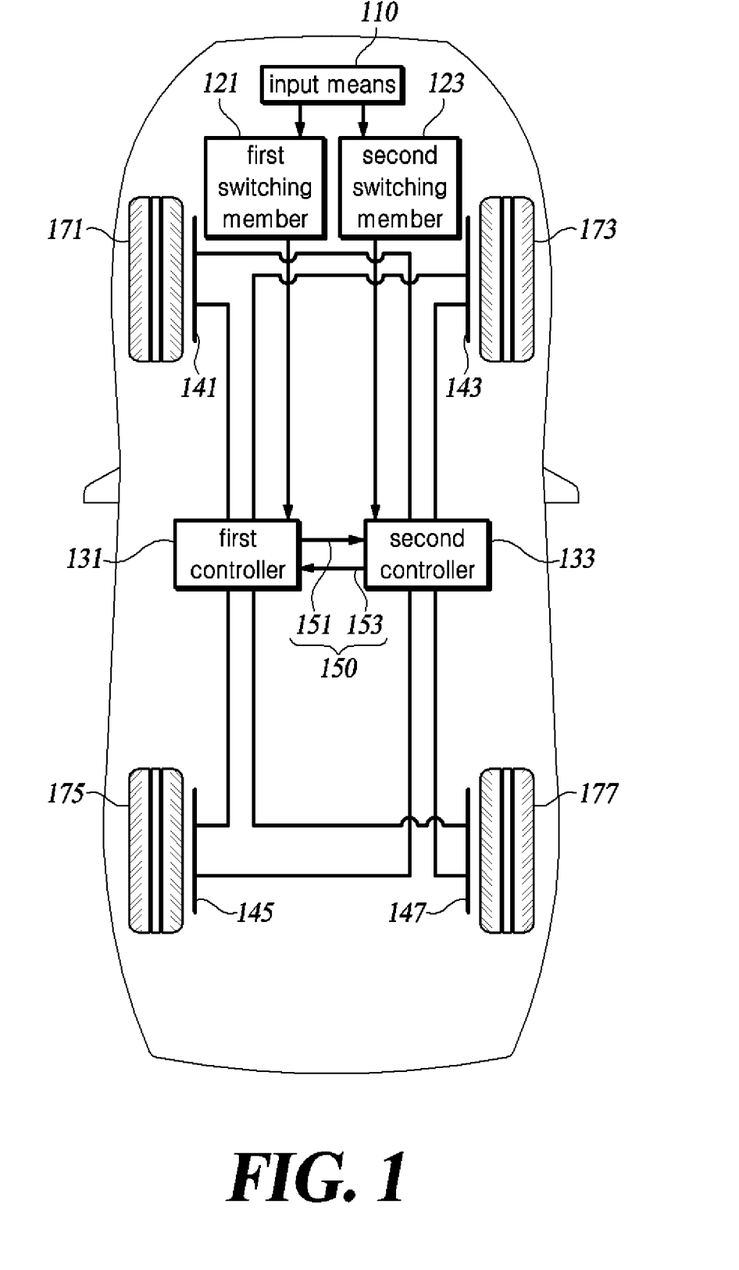
FIG. 1 is a plan view illustrating a brake apparatus for a vehicle according to an embodiment of the present disclosure.

FIG. 1 is a plan view illustrating a brake apparatus for a vehicle according to an embodiment of the present disclosure.

Figure 2:
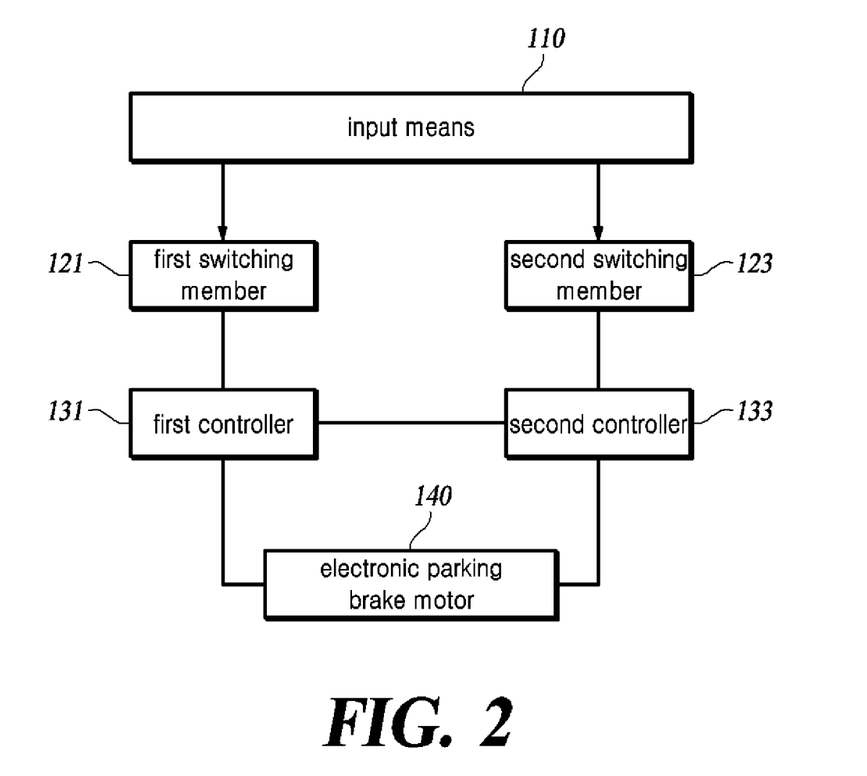
FIG. 2 is a block diagram illustrating a brake apparatus for a vehicle according to another embodiment of the present disclosure.

FIG. 2 is a block diagram illustrating a brake apparatus for a vehicle according to another embodiment of the present disclosure.

Referring to FIGS. 1 and 2, the parking start signal may be simultaneously transmitted to the switching members 121 and 123 through the input means. For example, by pushing a button on a navigation monitor of the vehicle, the signal may be generated and transmitted to the first and second switching members 121 and 123 at the same time. Here, the navigation monitor of the vehicle is one example of the input means 110.

Figure 3:
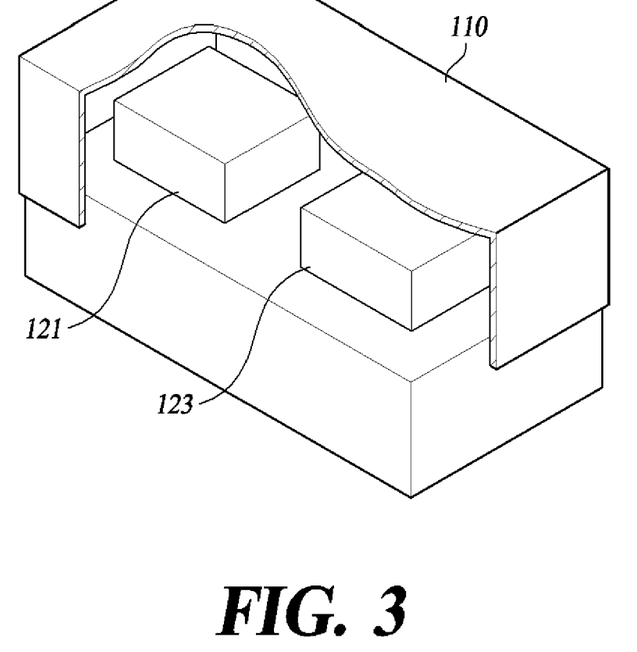
FIG. 3 is a perspective view illustrating an input means and switching members according to the present disclosure.

FIG. 3 is a perspective view illustrating an input means 110 and switching members 121 and 123 according to another embodiment of the present disclosure. Hereinafter, an operation in which the parking start signal is transmitted from the input means to each of the switching members 121 and 123 and a drive signal is transmitted from each of the switching members 121 and 131 to each of the controllers 131 and 133 will be described with reference to FIGS. 1 to 3.

Referring to FIG. 3, the brake apparatus for the vehicle according to an embodiment of the present disclosure is configured such that two parking brake switching members 121 and 123 are covered with one cover 110. The brake apparatus is configured such that the first and second switching members 121 and 123 simultaneously receive the parking start signal as a vehicle passenger presses the cover.

Here, the input means is the cover 110, and the parking start signal is a signal generated as the vehicle passenger presses the cover 110.

As the first and second switching members 121 and 123 receive the parking start signal, an algorithm of a switching member redundancy system is started.

The first controller 131 receives a first drive signal from the first switching member 121. The first controller 131 is configured to control the electronic parking brake motor 140.

The second controller 133 receives a second drive signal from the second switching member 123. The first and second controllers 131 and 133 may receive drive signals using hard wire from the first and second switching members 121 and 123, respectively. The second controller 133 is also configured to control the electronic parking brake motor 140. Referring to FIG. 2, the electronic parking brake motor 140 may be installed in the electronic parking brake, which is installed in each of wheels 171, 173, 175, and 177 of the vehicle. Thus, each first controller 131 and each second controller 133 may be configured to control one or more electronic parking brake motors 140.

Further, the second controller 133 is configured to transceive a switch fail signal with the first controller 131. The first controller 131 and the second controller 133 may transceive the switch fail signal using a CAN (Controller Area Network) communication method, but the present disclosure is not limited thereto.

For instance, the first controller 131 and the second controller 133 according to an embodiment of the present disclosure transceive a signal using the digital signal transmission line 150. The signal transmission period of the CAN (Controller Area Network) is about 10 ms. When an abnormal situation occurs in the first controller 131, the first controller 131 informs the second controller 133 of the abnormal situation using the CAN communication. If a signal of transferring the control right of the brake apparatus to the second controller 133 is transmitted, about 20 ms is required. On the other hand, the digital signal transmission line 150 requires less than 1 ms to transmit the digital signal. Thus, the brake apparatus for the vehicle according to an embodiment of the present disclosure allows the algorithm of a redundancy system to be more rapidly executed using the digital signal transmission line 150 in an emergency situation such as the failure of the switching members 121 and 123 or the controller.

The digital signal transmission line 150 may transmit two digital signals according to the magnitude of the voltage. For example, if the first controller 131 or the second controller 133 applies the voltage of about 5V to the digital signal transmission line 150, the signal may be High. If the voltage of about 0 V is applied, the signal may be Low. The digital signal transmission line 150 may be configured to transceive a normal signal or a fail signal between the first controller 131 and the second controller 133. Here, the normal signal may be 1, while the fail signal may be 0. The two digital signals may also be referred to as terms such as On/Off, High/Low and True/False instead of I/O, without being limited to the notation of the terms.

Referring to FIG. 1, a signal is transmitted from the first controller 131 to the second controller 133 using a first digital signal transmission line 151 according to an embodiment of the present disclosure. A signal is transmitted from the second controller 133 to the first controller 131 using a second digital signal transmission line 153 according to an embodiment of the present disclosure. The brake apparatus for the vehicle according to an embodiment of the present disclosure includes at least one of the first digital signal transmission line 151 and the second digital signal transmission line 153. By way of example, the first digital signal transmission line 151 may be configured to transmit the fail of the first drive signal or the fail signal of the first controller 131 to the second controller 133. Further, the second digital signal transmission line 153 may be configured to transmit the fail of the second drive signal to the second controller 133. In other words, the brake apparatus for the vehicle according to an embodiment of the present disclosure may include a plurality of digital signal transmission lines 150 having different functions rather than using one digital signal transmission line 150.

The electronic parking brake motor 140 is controlled by at least one of the first controller 131 and the second controller 133. Further, even when at least one of the first and second drive signals is abnormal, the electronic parking brake may be controlled by at least one of the first controller 131 and the second controller 133 based on a switch fail signal.

The first controller 131 may determine whether there is a fail in the first drive signal or the first drive signal is abnormal. The second controller 133 may determine whether there is a fail in the second drive signal or the second drive signal is abnormal. Hereinafter, two fails which may occur in each drive signal will be exemplified, and an algorithm for determining by each controller 131 or 133 whether the drive signal has a fail will be described.

First, it is determined whether there is a fail in a return value which returns to the first controller 131 after the first controller 131 transmitting a predetermined pattern of signal to the first switching member 121, so that the first controller 131 checks whether the hard wire sending the first drive signal is shorted. To be more specific, in the case that there is no fail in a circuit between the first switching member 121 and the first controller 131, it is determined that there is a fail in the return value when the first controller 131 receives a voltage which is different in magnitude than the return voltage.

Second, when impurities are stuck to the first switching member 121, the first switching member 121 may continuously output an erroneous signal value to the first controller 131. In this case, the first controller 131 may determine that the first switching member 121 is in a stuck situation.

In the present disclosure, terms such as first or second are simply used to distinguish two components from each other, and the above example is equally applied to the case of the second controller 133 and the second drive signal.

The fail of each drive signal which may be determined by the first controller 131 and the second controller 133 is not limited to the above example. In the present disclosure, a configuration for sensing a fail which occurs in the circuit connecting the first and second switching members 121 and 123 and the first and second controllers 131 and 133 is not limited to the above example. The brake apparatus for the vehicle according to an embodiment of the present disclosure may include a separate component for determining a fail in the drive signal.

The first controller 131 according to an embodiment of the present disclosure transmits a fail signal to the second controller 133 when there occurs a fail in the first drive signal. Further, the first controller 131 receives the second drive signal from the second controller 133. The first controller 131 receiving the second drive signal controls the electronic parking brake motor 140 based on the second drive signal. Here, the first controller 131 may be a main controller, while the second controller 133 may be a backup controller. Particularly, when the first controller 131 is the main controller and the second controller 133 is the backup controller, so that the first controller 131 has a higher specification than the second controller 133, the main controller having the higher specification controls the EPB in the above situation and the backup controller for redundancy is in a standby state. Thus, the first controller 131 has the control right to allow the electronic parking brake to be more precisely controlled. In this case, the second drive signal may be transmitted via a first digital signal connecting line from the second controller 133 to the first controller 131. When the main controller loses the driving function or braking function of the vehicle, the backup controller may take over the functions. The main controller and the backup controller may be disposed to be physically adjacent to each other, be installed in a single case, or be installed at separate positions in the vehicle.

On the other hand, when the second controller 133 is the main controller and the first controller 131 is the backup controller, the first controller 131 receives the second drive signal to control the electronic parking brake motor 140 based on the second drive signal, according to the same mechanism. In this case, the main controller having the higher specification has no control right. Nevertheless, even when there is a fail in the signals transmitted by the first and second switching members 121 and 123, it is possible to smoothly operate the electronic parking brake.

In the brake apparatus for the vehicle according to an embodiment of the present disclosure, when there is a fail in the first controller 131, the first controller 131 transmits the fail signal of the first controller 131 to the second controller 133. The second controller 133 receiving the fail signal of the first controller 131 receives the second drive signal to control the electronic parking brake motor 140. For example, the fail signal may be transceived using a second digital signal connecting line. The digital signal transmission line 150 may be configured to transceive a normal signal or a fail signal between the first controller 131 and the second controller 133. Here, the normal signal may be 1, and the fail signal may be 0. The two digital signals may also be referred to as terms such as On/Off, High/Low and True/False instead of I/O, without being limited to the notation of the terms.

The second controller 133 receiving the fail signal of the first controller 131 controls the electronic parking brake motor 140 based on the second drive signal. In this way, it is possible to implement a controller redundancy function which may control the electronic parking brake of the vehicle even if the main controller fails.

The brake apparatus for the vehicle according to an embodiment of the present disclosure further includes a memory unit which stores the fail records of the first controller 131 and the first switching member 121. The fail records stored in the memory unit make it easy to determine whether the first switching member 121 fails or not. If the fail records contain the contents of the fail, it is easy to repair a failed component.

The first warning light according to an embodiment of the present disclosure is turned on when there is a fail in the first controller 131. In this case, the second controller 133 may control to receive the fail signal of the first controller 131 and turn on the warning light. Such a function is particularly effective when the first controller 131 is the main controller. When the main controller mainly responsible for controlling one or more components mounted on the vehicle fails, the components of the vehicle are not properly controlled, which may cause serious safety problems. Therefore, the brake apparatus for the vehicle according to an embodiment of the present disclosure may indicate a danger signal by turning on the warning light to notify the fail of the first controller 131. If there is a fail in the drive signal transmitted by any one of the first and second switching members 121 and 123 other than the first and second controllers 131 and 133, this is not a fail of a component having the control right, so that the warning light is not turned on.

Figure 4:
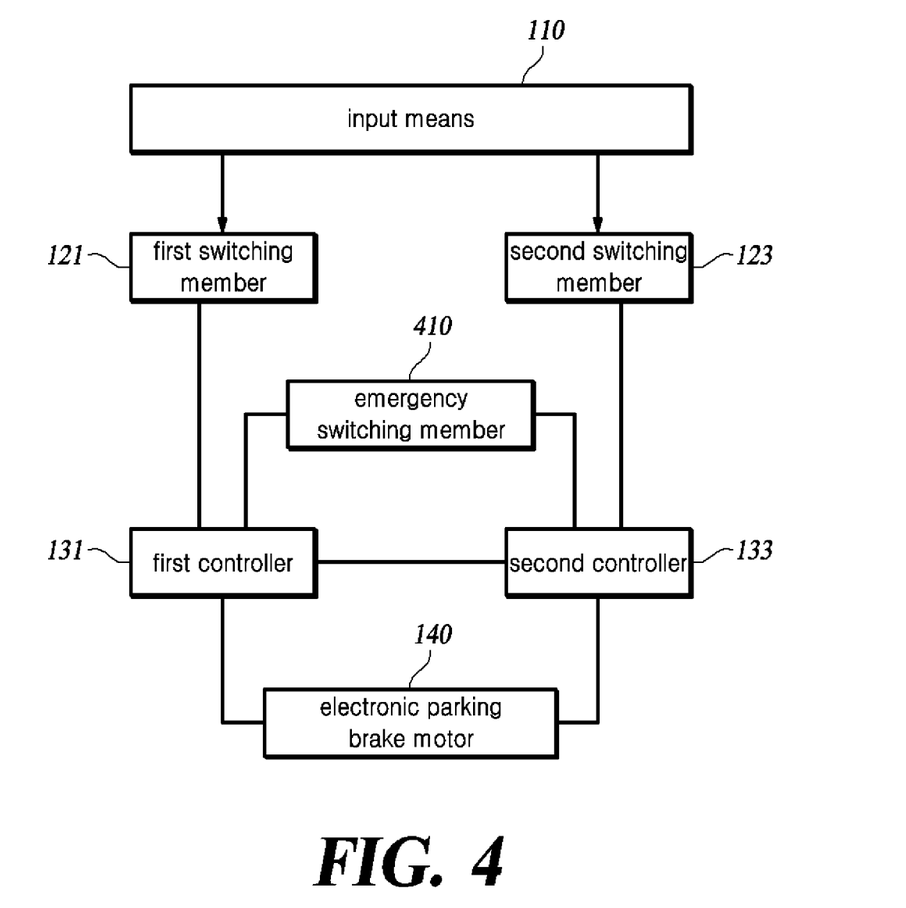
FIG. 4 is a block diagram illustrating an embodiment including an emergency switching member of the present disclosure.

FIG. 4 is a block diagram illustrating an embodiment including an emergency switching member 410 of the present disclosure.

Referring to FIG. 4, the emergency switching member 410 transmits a drive signal to each of the first controller 131 and the second controller 133. The emergency switching member 410 is installed in case that both the first switching member 121 and the second switching member 123 are not normally operated. When both the first switching member 121 and the second switching member 123 fail, a user presses the emergency switching member 410 to transmit the first and second drive signals.

The second warning light according to an embodiment of the present disclosure is turned on when there are fails in both the first drive signal and the second drive signal. In the present disclosure, the second warning light may use the same warning light as the first warning light. When there is a fail in only any one of the first drive signal or the second drive signal, it is possible to normally control the electronic parking brake according to the redundancy algorithm of the present disclosure. However, when there are fails in both the first switching member 121 and the second switching member 123, so that there are fails in both the first drive signal and the second drive signal, it is difficult to control the electronic parking brake as intended by a driver. Therefore, the second warning light is installed to inform the driver that an emergency situation has occurred.

The emergency switching member 410 according to an embodiment of the present disclosure releases the braking force of the electronic parking brake when the parking brake of the vehicle is performed by the electronic parking brake. When the parking brake of the vehicle is not performed, the parking brake of the vehicle is performed by the electronic parking brake after a predetermined time after the vehicle is stopped. Here, the parking brake means that the vehicle is braked by the braking force applied by the electronic parking brake. The brake apparatus for the vehicle according to an embodiment of the present disclosure uses the warning light to inform that there occurs a fail in a component of the vehicle.

The electronic parking brake motor 140 is controlled by at least one of the first controller 131 and the second controller 133. If the first and second switching members 121 and 123 receive the parking start signal, they transmit the first drive signal and the second drive signal to the first controller 131 and the second controller 133, respectively. The first controller 131 and the second controller 133 receiving the first drive signal and the second drive signal, respectively, control the electronic parking brake motor 140. In an embodiment of the present disclosure, the first controller 131 is a main controller and the second controller 133 is a backup controller. Therefore, in the case that the first controller 131 may normally control the electronic parking brake motor 140, the second controller 133 may be in a standby state without controlling the electronic parking brake motor 140. A piston of the electronic parking brake is translated toward a brake disc by driving the motor. The rotation of the wheel 170 is constrained as friction pads pressed by the translated piston press both sides of the brake disc.

As described above, when there is a fail in at least one of the first drive signal and the second drive signal, the electronic parking brake motor 140 is controlled by at least one of the first controller 131 and the second controller 133 based on the switch fail signal.

According to an embodiment of the present disclosure, either of the first controller 131 or the second controller 133 is a main controller, while a remaining one is a backup controller. This means that respective controllers forming the redundancy system of the controller are configured to have different specifications in consideration of cost. The effects of the controller redundancy structure in which the specifications of the two controllers are different may be supplemented by the effects of the present disclosure as in several examples described above.

A method of controlling a brake apparatus for a vehicle according to the present disclosure may be performed by the above-described brake apparatus for the vehicle.

Figure 5:
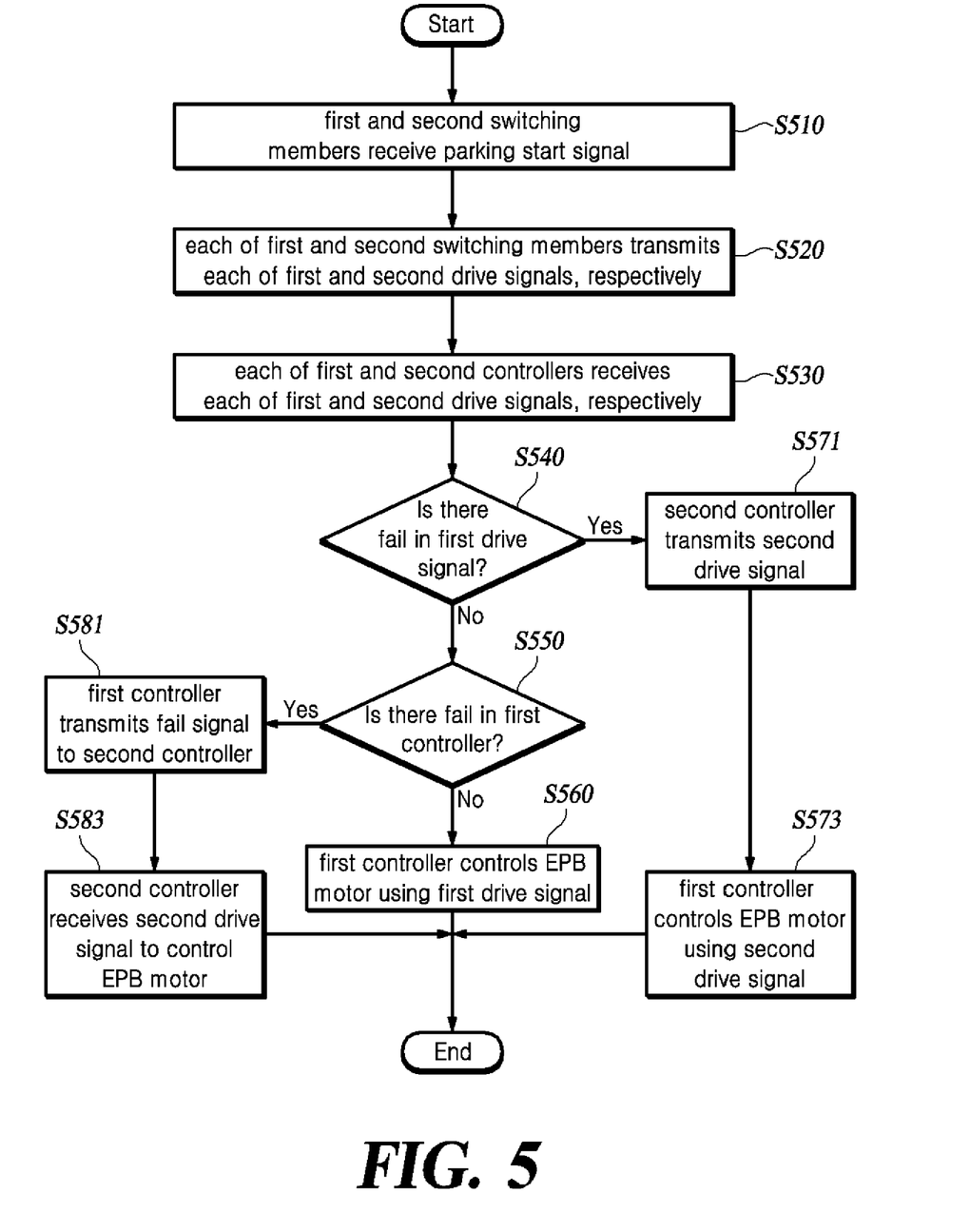
FIG. 5 is a flowchart illustrating a method of controlling a brake apparatus for a vehicle according to an embodiment of the present disclosure.

FIG. 5 is a flowchart illustrating a method of controlling a brake apparatus for a vehicle according to an embodiment of the present disclosure.

When the vehicle is driven, the first switching member 121 and the second switching member 123 simultaneously receive the parking start signal (S510). The first switching member 121 receiving the parking start signal generates the first drive signal, and the second switching member 123 generates the second drive signal, and then the first and second switching members transmit the signals to the first controller 131 and the second controller 133, respectively (S520). The first controller 131 receives the first drive signal, and the second controller 133 receives the second drive signal (S530). The first controller 131 may be the main controller, and the second controller 133 may be the backup controller. The first controller 131 and the second controller 133 may transceive the switch fail signal.

In the method of controlling the brake apparatus for the vehicle according to an embodiment of the present disclosure, it is determined whether there is a fail in the first drive signal (S540). The first controller 131 may be configured to determine whether there is a fail in the first drive signal, and the second controller 133 may be configured to determine whether there is a fail in the second drive signal. However, without being limited thereto, the method of controlling the brake apparatus for the vehicle according to the present disclosure may include a step of determining whether there is a fail in each of the controllers 131 and 133 by other components. When it is determined that there is a fail in the first drive signal, the first controller 131 transmits the information to the second controller 133. When there is a fail in the first drive signal, the first controller 131 receives the second drive signal from the second controller 133 (S571). Here, the first controller 131 and the second controller 133 may exchange information about the fail in the drive signal or the drive signal via the digital signal transmission line 150. The first controller 131 receiving the second drive signal from the second controller 133 controls the electronic parking brake motor 140 based on the second drive signal (S573).

In the method of controlling the brake apparatus for the vehicle according to an embodiment of the present disclosure, when there is a fail in the first controller 131, the first controller 131 transmits the fail signal of the first controller 131 (S581). The fail signal may be transmitted via the digital signal transmission line 150. The second controller 133 receiving the fail signal from the first controller 131 may receive the second drive signal to control the electronic parking brake motor 140 (S583). In describing the components according to the embodiment of the present disclosure, terms "first" or "second" are only for distinguishing the components from other components, and the nature, sequence or order of the components are not limited by the symbols. Therefore, the above-described algorithm is equally applied even when the first controller 131 and the second controller 133 are the second controller 133 and the first controller 131, respectively. When there is a fail in at least one of the first driving signal and the second driving signal according to the above algorithm, the electronic parking brake motor 140 is controlled by at least one of the first controller 131 and the second controller 133 based on the switch fail signal.

When there is no fail in each drive signal and each controller, the first controller 131 controls the electronic parking brake using the first drive signal (S560). After the step S583, the algorithm of FIG. 5 is terminated.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. An apparatus for controlling braking of a vehicle, comprising:
    a first switching member configured to receive a parking start signal and generate a first drive signal in response to receiving the parking start signal;
    a second switching member configured to receive the parking start signal and generate a second drive signal in response to receiving the parking start signal;
    a first controller configured to receive the first drive signal generated by the first switching member;
    a second controller configured to receive the second drive signal generated by the second switching member, the first and second controllers further configured to transceive a switch fail signal with each other; and
    an electronic parking brake motor configured to be controlled by at least one of the first and second controllers,
    wherein, when at least one of the first and second drive signals is abnormal, the electronic parking brake motor is controlled by at least one of the first and second controllers based on the switch fail signal.

2. The apparatus of claim 1, wherein the first and second controllers are configured to transceive the switch fail signal via a digital signal transmission line.

3. The apparatus of claim 2, wherein the digital signal transmission line comprises at least one of:
    a first digital signal transmission line configured to transmit the switch fail signal from the first controller to the second controller; and
    a second digital signal transmission line configured to transmit the switch fail signal from the second controller to the first controller.

4. The apparatus of claim 1, wherein, when the first drive signal is abnormal, the first controller transmits the switch fail signal to the second controller, receives the second drive signal from the second controller, and controls the electronic parking brake motor based on the received second drive signal.

5. The apparatus of claim 1, wherein, when a fail occurs in the first controller, the first controller transmits a first controller fail signal to the second controller, and the second controller receives the first controller fail signal from the first controller, receives the second drive signal, and controls the electronic parking brake motor based on the received second drive signal.

6. The apparatus of claim 1, wherein:
    the first controller is configured to determine whether the first drive signal is abnormal, and
    the second controller is configured to determine whether the second drive signal is abnormal.

7. The apparatus of claim 4, further comprising a memory unit storing a fail record of the first switching member.

8. The apparatus of claim 5, further comprising a warning light configured to be turned on when the fail occurs to the first controller.

9. The apparatus of claim 1, further comprising an emergency switching member configured to transmit a drive signal to each of the first controller and the second controller.

10. The apparatus of claim 9, further comprising a warning light configured to be turned on when both the first and second drive signals are abnormal.

11. The apparatus of claim 9, wherein, based on the drive signal of the emergency switching member,
    a parking brake of the vehicle is released when the vehicle is parked by the electronic parking brake, and
    the vehicle is parked by the electronic parking brake after a predetermined time after the vehicle is stopped when the vehicle is not parked by the electronic parking brake.

12. The apparatus of claim 1, wherein one of the first and second controllers is a main controller, and the other is a backup controller.

13. A method of operating a brake apparatus for a vehicle, the brake apparatus comprising an electronic parking brake, first and second switching members, first and second controllers, the method comprising:
    receiving, at the first switching member, a parking start signal and causing the first switching member to transmit a first drive signal;
    receiving, at the second switching member, the parking start signal and causing the second switching member to transmit a second drive signal;
    receiving, at the first controller, the first drive signal transmitted from the first switching member;
    receiving, at the second controller, the second drive signal transmitted from the second switching member;
    causing the first and second controllers to transceive a switch fail signal with each other; and
    controlling an electronic parking brake motor using at least one of the first and second controllers based on the switch fail signal when at least one of the first drive signal and the second drive signal is abnormal.

14. The method of claim 13, further comprising:
    receiving, at the first controller, the second drive signal transmitted from the second controller when the first drive signal is abnormal; and
    causing the first controller to control the electronic parking brake motor based on the second drive signal.

15. The method of claim 14, further comprising:
    transmitting, at the first controller, a first controller fail signal, when a fail occurs in the first controller; and receiving, at the second controller, the first controller fail signal and the second drive signal, and causing the second controller to control the electronic parking brake motor based on the received second drive signal.

\* \* \* \* \*